United States Patent
Wang et al.

(10) Patent No.: US 11,075,050 B2
(45) Date of Patent: Jul. 27, 2021

(54) MINIATURE SLOW-WAVE TRANSMISSION LINE WITH ASYMMETRICAL GROUND AND ASSOCIATED PHASE SHIFTER SYSTEMS

(71) Applicant: Analog Devices International Unlimited Company, Limerick (IE)

(72) Inventors: Xudong Wang, Colorado Springs, CO (US); Michael W. Bagwell, Colorado Springs, CO (US); William B. Beckwith, Larkspur, CO (US); Thomas E. Schiltz, Colorado Springs, CO (US)

(73) Assignee: Analog Devices International Unlimited Company, Limerick (IE)

( * ) Notice: Subject to any disclaimer, the term of this patent is extended or adjusted under 35 U.S.C. 154(b) by 62 days.

(21) Appl. No.: 16/294,743

(22) Filed: Mar. 6, 2019

(65) Prior Publication Data
US 2020/0118781 A1    Apr. 16, 2020

Related U.S. Application Data

(60) Provisional application No. 62/745,272, filed on Oct. 12, 2018.

(51) Int. Cl.
| | |
|---|---|
| H01J 23/24 | (2006.01) |
| H01P 3/00 | (2006.01) |
| H01Q 1/46 | (2006.01) |
| H04B 10/548 | (2013.01) |

(52) U.S. Cl.
CPC .............. *H01J 23/24* (2013.01); *H01P 3/003* (2013.01); *H01Q 1/46* (2013.01); *H04B 10/548* (2013.01)

(58) Field of Classification Search
CPC ......... H01P 3/003; H01J 23/24; H04B 10/548
USPC ................................ 333/138, 144, 156, 24.1
See application file for complete search history.

(56) References Cited

U.S. PATENT DOCUMENTS

| | | |
|---|---|---|
| 5,777,532 A | 7/1998 | Lakin |
| 6,950,590 B2 | 9/2005 | Cheung et al. |
| 7,570,133 B1 | 8/2009 | Taft et al. |
| 8,264,300 B2 | 9/2012 | Cisco |
| 8,410,863 B2 | 4/2013 | Satou et al. |
| 8,760,245 B2 | 6/2014 | Mina et al. |

(Continued)

FOREIGN PATENT DOCUMENTS

| | | |
|---|---|---|
| CN | 1788382 A | 6/2006 |
| CN | 102099957 A | 6/2011 |

(Continued)

OTHER PUBLICATIONS

English translation of Abstractor JP06104603A (Year: 1994).*
Ponchak et al., Excitation of Coupled Slotline Mode in Finite-Ground CPW With Unequal Ground-Plane Widths. IEEE Transactions on Microwave Theory and Techniques. Feb. 2005; 53(2): 713-717.

(Continued)

*Primary Examiner* — Rakesh B Patel
(74) *Attorney, Agent, or Firm* — Wolf, Greenfield & Sacks, P.C.

(57) ABSTRACT

Miniature slow-wave transmission lines are described having an asymmetrical ground configuration. In some embodiments, the asymmetrical ground configuration facilitates a reduction in size. Non-uniform auxiliary conductors may be disposed above or below the co-planar waveguide to facilitate a reduction in the length of the miniature slow-wave transmission lines. Phase shifters may be implemented having a reduced size by including one or more miniature slow-wave transmission lines.

20 Claims, 10 Drawing Sheets

(56) References Cited

U.S. PATENT DOCUMENTS

| | | |
|---|---|---|
| 8,766,747 B2 | 7/2014 | Mina et al. |
| 9,059,679 B2 | 6/2015 | Edelstein et al. |
| 9,853,340 B2 | 12/2017 | Leipold et al. |
| 2004/0155728 A1 | 8/2004 | Cheung et al. |
| 2005/0040915 A1 | 2/2005 | Ryu et al. |
| 2007/0242915 A1 | 10/2007 | Kuver et al. |
| 2012/0139667 A1 | 6/2012 | Mina et al. |
| 2013/0154773 A1 | 6/2013 | Siprak |
| 2020/0218126 A1* | 7/2020 | Iwatsuka ............... G02F 1/225 |

FOREIGN PATENT DOCUMENTS

| | | | |
|---|---|---|---|
| CN | 102820499 A | | 12/2012 |
| JP | H05251914 A | | 9/1993 |
| JP | 06104603 A | * | 4/1994 |
| JP | 2007306290 A | | 11/2007 |
| JP | 4125767 B2 | | 7/2008 |

OTHER PUBLICATIONS

Song et al., Widebrand mm-wave phase shifters Based on Constant-Impedance Tunable Transmission Lines. 2016 IEEE MTT-S International Microwave Symposium. 2016; 4 pages.

Extended European Search Report dated Feb. 19, 2020 in connection with European Application No. 19197846.9.

Hsu et al., U-shaped Slow-wave Transmisison Lines in 0.18μm CMOS. IEEE International Symposium on Circuits and Systems. ISCAS 2010. May 30-Jun. 2, 2010; 1296-1299.

Kitazawa et al., Quasi-static Characteristics of Asymmetrical and Coupled Coplanar-Type Transmission Lines. IEEE Transactions on Microwave Theory and Techniques. Sep. 1985; MTT-33 (9); 771-778.

Komijani et al., A 24GHz, +14.5dBm Fully-Integrated Power Amplifier in 0.18μm CMOS. Proceedings of the IEEE 2004 Custom Integrated Circuits Conference. Oct. 3, 2004; 561-564.

* cited by examiner

US 11,075,050 B2

MINIATURE SLOW-WAVE TRANSMISSION LINE WITH ASYMMETRICAL GROUND AND ASSOCIATED PHASE SHIFTER SYSTEMS

CROSS REFERENCE TO RELATED APPLICATIONS

This application claims the benefit under 35 U.S.C. § 119(e) of U.S. Provisional Application Ser. No. 62/745,272, filed Oct. 12, 2018, and entitled "MINIATURE SLOW-WAVE TRANSMISSION LINE WITH ASYMMETRICAL GROUND AND ASSOCIATED PHASE SHIFTER SYSTEMS," which is incorporated herein by reference in its entirety.

FIELD OF THE DISCLOSURE

Aspects of the present application relate to slow-wave transmission lines.

BACKGROUND

Phase shifters are conventionally employed in phased-array antenna systems and hybrid structure systems. Some such phase shifters employ slow-wave transmission lines to create a time delay, resulting in a corresponding phase shift in signals traveling therethrough. Some such slow-wave transmission lines include co-planar waveguides.

SUMMARY OF THE DISCLOSURE

Miniature slow-wave transmission lines are described having an asymmetrical ground configuration. In some embodiments, the asymmetrical ground configuration facilitates a reduction in size. Non-uniform auxiliary conductors may be disposed above or below the co-planar waveguide to facilitate a reduction in the length of the miniature slow-wave transmission lines. Phase shifters may be implemented having a reduced size by including one or more miniature slow-wave transmission lines.

In some embodiments, a miniature slow-wave transmission line is provided, that comprises a substrate, a signal conductor fabricated on a first layer of the substrate, first and second ground conductors fabricated on the first layer, disposed on opposite sides of the signal conductor and being asymmetrical about the signal conductor, and a plurality of auxiliary conductors fabricated on a second layer of the substrate, capacitively coupled to the signal conductor and conductively coupled to the first and second ground conductors.

In some embodiments, a phase shifter is provided, that comprises a substrate, a variable delay signal path between an input and an output of the phase shifter comprising a plurality of slow-wave transmission lines switchable into and out of the variable delay signal path, a first slow-wave transmission line of the plurality of slow-wave transmission lines comprising a signal conductor on a first layer of the substrate, first and second ground conductors on the first layer, disposed on opposite sides of the signal conductor and being asymmetrical about the signal conductor, and a plurality of auxiliary conductors on a second layer of the substrate, capacitively coupled to the signal conductor and conductively coupled to the first and second ground conductors.

In some embodiments, a system is provided, that comprises a phase shifter, comprising a substrate, a variable delay signal path between an input and an output of the phase shifter comprising a plurality of slow-wave transmission lines switchable into and out of the variable delay signal path, a first slow-wave transmission line of the plurality of slow-wave transmission lines comprising a signal conductor on a first layer of the substrate, first and second ground conductors on the first layer, disposed on opposite sides of the signal conductor and being asymmetrical about the signal conductor, a plurality of auxiliary conductors on a second layer of the substrate, capacitively coupled to the signal conductor and conductively coupled to the first and second ground conductors, and a controller comprising one or more components configured to transmit logic signals to a plurality of switches to control the plurality of slow-wave transmission lines switching into and out of the variable delay signal path.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
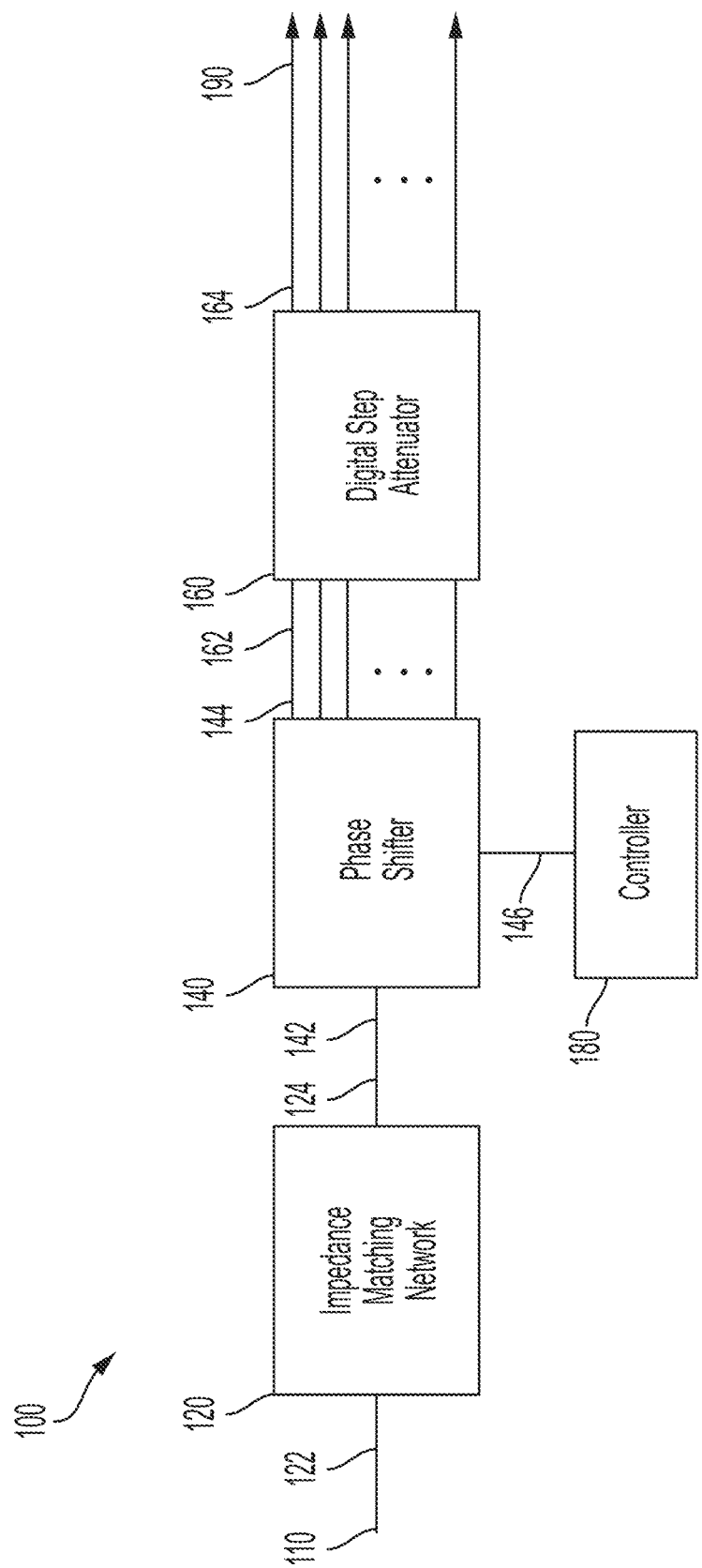
FIG. 1 is a block diagram of an exemplary system comprising a slow-wave phase shifter according to an aspect of the present application.

According to an aspect of the present application, a miniature slow-wave transmission line may have a reduced size, thus reducing the cost of producing the miniature slow-wave transmission line, for example, in an integrated circuit. In some embodiments, the miniature slow-wave transmission line may include a co-planar waveguide with an asymmetrical ground configuration to facilitate a width reduction of the miniature slow-wave transmission line. In some embodiments, the miniature slow-wave transmission line may include non-uniform auxiliary conductors on a separate layer from the co-planar waveguide for a reduced length without sacrificing a desired time delay or impedance of the miniature slow-wave transmission line. A phase shifter implemented using one or more miniature slow-wave transmission lines may have a reduced size, and likewise may have a reduced production cost.

Transmission lines may be implemented as components in microwave and millimeter-wave circuits, such as phased array systems or hybrid structure systems. For example, transmission lines may be used in baluns, matching components, delay lines, power combiners or couplers.

In a phased-array system, many antenna elements may be connected in parallel to form an array with a signal fed to each element in the array. In order to create a desired radiation pattern of the array, a relative phase of the signals may be adjusted at each element. For example, if it is desired that the radiation pattern be steered in a given direction, the signals received may ascend or descend in phase within the array so as to realize the desired steering effect. In radar applications, phase delay or time delay circuits may be used to control beam steering in an active array radar system.

In a hybrid structure system, many electronic devices may be configured to receive many phase-shifted versions of a signal. Phase delay or time delay circuits may be used to create phase-shifted versions from an input signal and to provide phase-shifted output signals.

Phase delay components may be implemented as inductor-capacitor (L-C) networks, and time delay components may be implemented as transmission line networks in order to make phase adjustments. L-C circuits are conventionally used at lower frequencies (e.g. below 20-30 GHz) where transmission lines may be large, but are limited in bandwidth. In contrast, transmission lines may offer a more broadband solution, but with added difficulty and/or cost owing to increased size. L-C phase delay networks create a "true" phase delay, such that the inductance and/or capacitance of the phase delay network may introduce a phase adjustment without necessarily adjusting the time at which the signal reaches the output of the network. Transmission line delay networks create a "true" time delay, such that a phase adjustment may be introduced by adjusting the time at which the signal reaches the output of the network. True time delay may be preferable in phased-array systems because it may ensure that electronic signals traveling along different paths arrive at the destination at the prescribed time.

In many applications, a desired electrical length of a transmission line may be proportional to a wavelength of signals carried by the line. In some cases, this may result in a large desired transmission line length, leading to an increased cost of implementation in an integrated circuit. Thus, it may be difficult to utilize transmission lines efficiently in RF and microwave integrated circuits.

By decreasing a propagation velocity of the transmission line, a shorter physical length may be used to realize a given electrical length. Thus, a desired phase or time delay through the transmission line may be achieved with a shorter physical structure. Such a transmission line is often referred to as a slow-wave transmission line. A slow-wave transmission line may reduce the size and cost of transmission lines, thus facilitating their use in microwave and millimeter wave applications.

Some transmission lines are implemented as co-planar waveguide (CPW) structures. A CPW structure may comprise a signal conductor and a pair of ground conductors arranged on either side of the signal conductor within a same conductive layer. For example, the signal conductor and the pair of ground conductors may be fabricated side-by-side on a substrate such as a printed circuit board or a silicon wafer.

Some CPW structures are implemented as slow-wave structures. A slow-wave CPW structure may comprise an array of floating auxiliary conductors elongated perpendicular to the signal conductor direction and disposed along the signal conductor direction in a layer below the signal and ground conductors. By capacitively coupling to the auxiliary conductors, a capacitance of the CPW structure may be increased, resulting in a decreased propagation velocity. However, design constraints such as manufacturing conductor density limits create additional challenges for a slow-wave transmission line with a reduced size. For example, a manufacturer may limit how closely the array of auxiliary conductors may be fabricated relative to one another.

For a CPW transmission line or a slow-wave CPW transmission line, good grounding of the may improve overall performance. A CPW may be implemented as a meandering shape such as an S shape with exterior ground conductors on an outside of the shape and interior ground conductors within an inside of the shape. One of the exterior ground conductors and one of the interior ground conductors may function as a pair of ground conductors with a signal conductor in between along the meandering path.

Ground conductors are conventionally made as wide as possible to approximate infinite ground surrounding the signal conductor. However, wide ground conductors may result in a large overall size CPW. The exterior ground conductors on the outside of the structure may be well grounded on the chip. However, the interior ground conductors may behave as inductors. Thus, grounding may degrade as the interior ground conductors are made longer and the inductance increases. Widening the conductors may provide better grounding operation. However, this approach may increase the overall size of the CPW line structure.

Aspects of the present application provide a miniaturized slow-wave transmission line exhibiting an asymmetrical ground configuration. A signal conductor of the CPW structure may capacitively couple to an array of floating auxiliary conductors, and a pair of ground conductors of the CPW structure may be conductively coupled to the auxiliary conductors through an array of vias. One of the ground conductors may be narrower than another of the ground conductors, thus reducing the size of the overall structure. The asymmetrical ground configuration may exhibit reduced inductance and thus enhanced grounding by conductively coupling the pair of ground conductors through the auxiliary conductors.

Aspects of the present application provide a miniaturized slow-wave transmission line which may be selectively implemented with increased or decreased delay even where conductor density may be limited, for example by a manufacturer. In some embodiments, a width of the array of auxiliary conductors may vary in the direction perpendicular to the signal conductor direction. A portion of some or all of the auxiliary conductors disposed under the pair of ground conductors may be narrower than a portion of the some or all of the auxiliary conductors disposed under the signal conductor. Thus, an increased capacitance and a resulting increased delay may be achieved under a limited conductor density. Alternatively, the portion of some or all of the auxiliary conductors disposed under the pair of ground conductors may be wider than the portion of the some or all of the auxiliary conductors disposed under the signal conductor. Thus, a decreased capacitance and a resulting decreased delay may be achieved under the limited conductor density.

Aspects of the present application provide a miniaturized slow-wave transmission line which may be implemented with even further increased delay. In some embodiments, one or more—and in some cases each—of the ground conductors may comprise an array of conductive strips extending towards the signal conductor. Some or all of the conductive strips of a ground conductor may be narrower at a portion closer to the ground conductor than at a portion closer to the signal conductor. An increased capacitance from the conductive strips may result in a further increased delay of the miniaturized slow-wave transmission line.

Aspects of the present application provide a miniature phase shifter which may be implemented using one or more miniature slow-wave transmission lines. A phase shifter may comprise one or more switches for switching the slow-wave transmission lines into and out of a variable delay signal path in response to logic signals received from a controller. For example, one of the switches may switch a slow-wave transmission line into or out of the variable delay signal path, thereby controlling whether a signal input to the phase shifter travels through or bypasses the slow-wave transmission line. Alternatively, the switch may switch a first slow-wave transmission line into the variable delay signal path and switch a second slow-wave transmission line out of the variable delay signal path, thereby controlling the signal to travel through the first slow-wave transmission line and to bypass the second slow-wave transmission line. The first and second slow-wave transmission lines may each provide the signal with a different phase delay. By incorporating one or more miniature slow-wave transmission lines, the miniature phase shifter may exhibit improved space and cost efficiency. It should be appreciated that in a phased array system with 1024 antenna elements, each having a multi-bit (e.g., 6 bit) phase shifter, a reduction in size for each bit of the phase shifter may sum to a significant decrease in overall size of the phase shifter.

Aspects of the present application provide a miniature CPW structure using a slow-wave configuration which may allow the middle ground fingers to be reduced in width while providing good grounding for the electromagnetic (EM) fields. Overall grounding of the signal line may be provided at least in part by good grounding with wide exterior traces of the structure. Internal grounding may be reduced in size and compensated for with slow-wave structures, which maintain good phase performance and low loss.

Turning to the figures, FIG. 1 is a block diagram of an exemplary system 100 comprising a slow-wave phase shifter according to an aspect of the present application. In the illustrated embodiment, the system 100 comprises an impedance matching network 120, a phase shifter 140, a controller 180, and a digital step attenuator 160. The impedance matching network 120 is connected to the phase shifter 140, and the phase shifter 140 is connected to the digital step attenuator 160. The controller 180 is connected to the phase shifter 140.

The system 100 is configured to receive one or more signals at an input 110, and to provide one or more phase shifted versions of the signal at one or more outputs 190. In some embodiments, the system 100 comprises a phased array system. For example, the system 100 may be configured to receive an input signal at the input 110 and to generate an array of phase shifted output signals at the output(s) 190 for sending to an array of antenna elements coupled to the system 100. In some embodiments, the system 100 comprises a hybrid system. For example, the system 100 may be configured to receive an input signal at the input 110 and to generate two or more phase shifted output signals at the outputs 190 to be used in an electronics system coupled to the hybrid system. In some embodiments, the controller 180 is also connected to the digital step attenuator 160, or to an external control system (not shown). In some embodiments, the impedance matching network 120, phase shifter 140, controller 180, and digital step attenuator 160 are contained within a single integrated circuit package. In some embodiments, some or all of the impedance matching network 120, phase shifter 140, controller 180, and digital step attenuator 160 may be separately contained within two or more separate integrated circuit packages. It should be appreciated that, although an impedance matching network 120 and digital step attenuator 160 are illustrated in FIG. 1, some embodiments do not comprise an impedance matching network 120 and/or a digital step attenuator 160.

The impedance matching network 120 may comprise an input 122 coupled to input 110 of the system 100 and an output 124 coupled to an impedance transformer, with the impedance transformer being configured to match an impedance between the input 122 and the output 124 of the impedance matching network 120. The input 122 of the impedance matching network 120 may be configured to receive a signal at the input 110 of the system 100 having a first impedance. The output 124 of the impedance matching network 120 may be configured to transmit a signal having a second impedance which may be different from the first impedance. In some embodiments, the impedance matching network 120 comprises an inductor and/or a capacitor. In some embodiments, the impedance matching network 120 comprises a transmission line impedance transformer. The inventors have recognized and appreciated that increased capacitance in a phase shifter comprising miniature slow-wave transmission lines may be matched through an inductance coupled to an input of the phase shifter. Accordingly, in some embodiments the impedance matching network 120 comprises an inductance configured to match with a capacitance of the phase shifter. The output 124 of the impedance matching network 120 is coupled to the phase shifter 140.

The phase shifter 140 may comprise one or more miniature slow-wave transmission lines coupled between one or more inputs 142 and one or more outputs 144. In some embodiments, the phase shifter 140 is configured to provide a variable delay to signals received at the input(s) 142, comprising slow-wave transmission lines switchable into and out of a variable delay signal path. Each slow-wave transmission line may be a miniature slow-wave CPW, comprising a signal conductor with a pair of ground conductors disposed on a same layer on each side of the signal conductor. Various embodiments of miniature slow-wave CPWs which may be incorporated in the phase shifter 140 are described herein including in connection with FIGS. 2A-2D and 3-6. Various embodiments of the phase shifter 140 are described herein including in connection with FIGS. 7-9. The phase shifter 140 may further comprise one or more switches each configured to control a variable delay of the phase shifter 140. For example, one of the switches may be configured to receive a logic signal (e.g., one or more bits), and to switch one or more of the miniature slow-wave transmission lines into or out of the variable delay signal path of the phase shifter 140 depending on the logic signal. Alternatively, the switch may be configured to switch one of the miniature slow-wave transmission lines into the variable delay signal path of the phase shifter 140, and to switch another of the miniature slow-wave transmission lines out of the variable delay signal path depending on the logic signal. Thus, the switches may be configured to control a variable delay of the phase shifter 140. It should be appreciated that the switches may be alternatively controlled using analog signals rather than digital logic signals. In the illustrated embodiment, a control input 146 of the phase shifter 140 is coupled to the controller. However, in some embodiments, one or more of the slow-wave transmission lines are not controlled by switches and operation of the one or more slow-wave transmission lines is fixed. Thus, the phase shifter 140 may not be coupled to a controller.

The controller 180 may comprise analog or digital circuitry configured to control one or more switches of the phase shifter 140. For example, the controller 180 may comprise one or more digital logic components configured to transmit logic signals (e.g., one or more bits) to the switches of the phase shifter 140. For example, the controller may be configured to switch one or more miniature slow-wave transmission lines into or out of a variable delay signal path of the phase shifter 140. In the illustrated embodiment, the controller 180 is only coupled to the phase shifter 140. However, it should be appreciated that in some embodiments, the controller 180 is additionally coupled to an external control component, or to control circuitry elsewhere in the system 100. Thus, the controller 180 may be configured to receive control commands and to adjust the phase shifter 140 accordingly. In the illustrated embodiment, the output(s) 144 of the phase shifter 140 are coupled to the digital step attenuator 160.

The digital step attenuator 160 may comprise one or more inputs 162 and one or more outputs 164. The digital step attenuator 160 may further comprise one or more amplification components configured to adjust an amplitude of the input(s) 162 and to provide an adjusted output at the output(s) 164. For example, the phase shifter 140 may be unequally lossy across one or more delay lines. Thus, the digital step attenuator 160 may be configured to equalize the amplitude of signals from the one or more delay lines. In a phased array system, one or more antenna elements may be connected to the output(s) 164. Accordingly, the one or more antenna elements may each receive and transmit a signal having an equal amplitude. Alternatively, in a hybrid system, one or more analog or digital components may each receive a signal having an equal amplitude. Thus, the system 100 may be configured to receive one or more signals, and to provide one or more phase shifted versions of the signal at one or more outputs.

FIGS. 2A-2D show multiple views of a miniature slow-wave transmission line 200 according to a non-limiting embodiment of the present application. In some embodiments, the miniature slow-wave transmission line may be used in a phase shifter such as phase shifter 140 of FIG. 1.

Figure 2A:
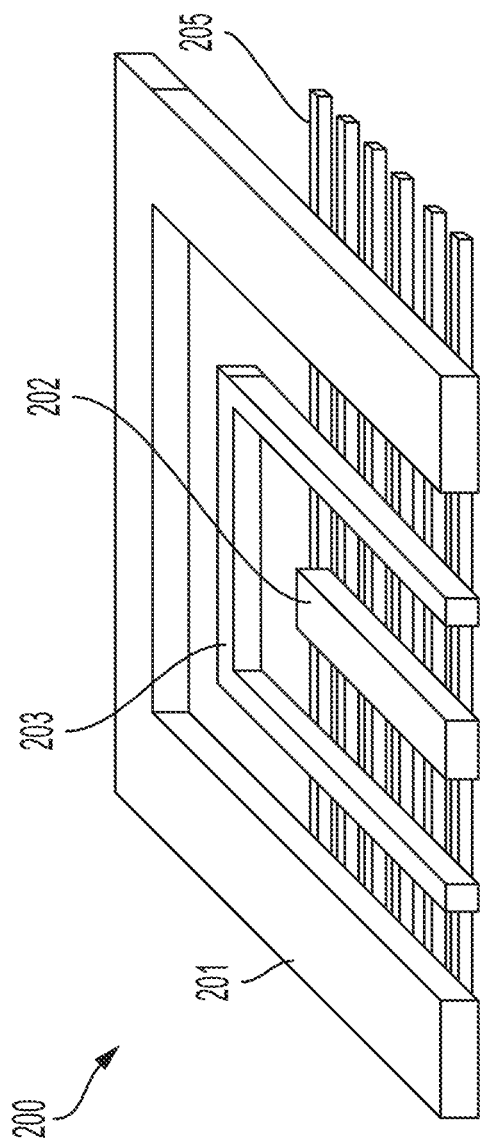
FIG. 2A is a perspective view of an implementation of a slow-wave transmission line according to a non-limiting embodiment of the present application.
Figure 2B:
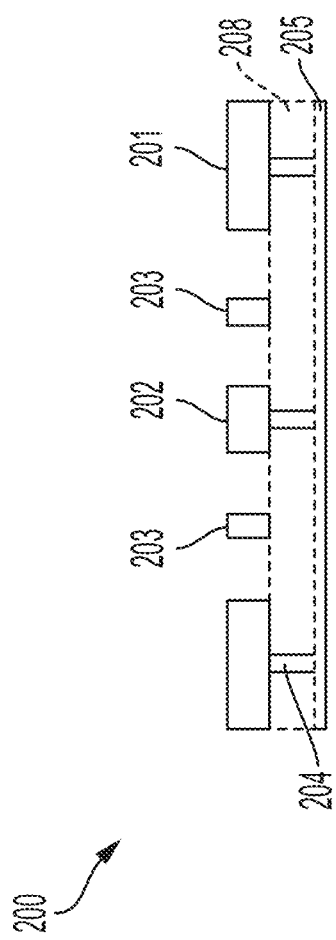
FIG. 2B is a cross sectional view of the slow-wave transmission line illustrated in FIG. 2A.
Figure 2D:
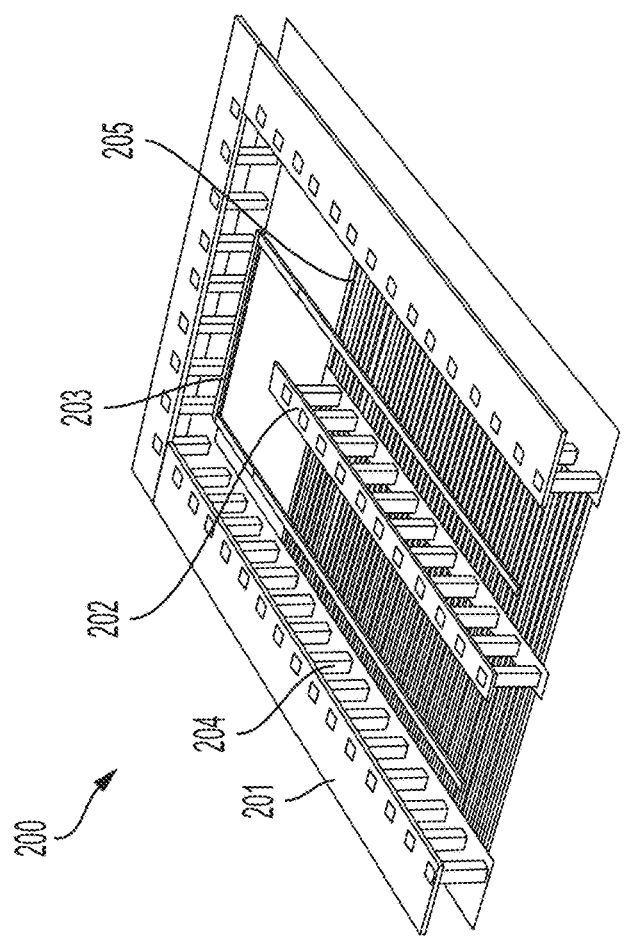
FIG. 2D is a perspective view of the slow-wave transmission line illustrated in FIG. 2A.
Figure 2C:
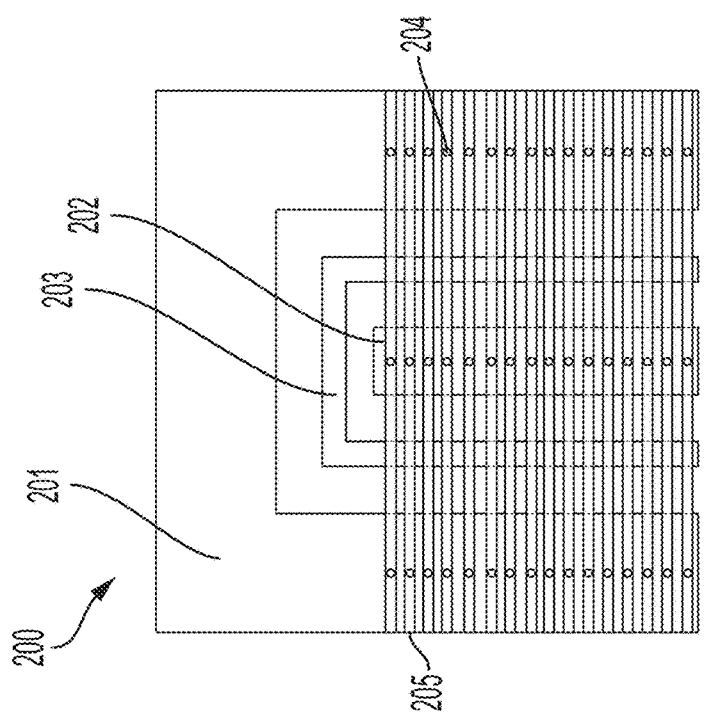
FIG. 2C is a top view of the slow-wave transmission line illustrated in FIG. 2A.

FIG. 2A is a perspective view of a miniature slow-wave transmission line 200. FIG. 2B is a cross sectional view of the miniature slow-wave transmission line 200. FIG. 2C is a top view of the miniature slow-wave transmission line 200. FIG. 2D is a perspective view of the miniature slow-wave transmission line 200. In the illustrated embodiment, the miniature slow-wave transmission line 200 comprises a CPW. The miniature slow-wave transmission line 200 comprises a signal conductor 203 and a pair of ground conductors 201 and 202 disposed on a same layer of a substrate 208. The pair of ground conductors 201 and 202 may be disposed on opposite sides of the signal conductor 203. The signal conductor 203 may be electrically isolated from the pair of ground conductors 201 and 202. The pair of ground conductors 201 and 202 may be asymmetrical about the signal conductor 203. For example, in the illustrated embodiment, the internal ground conductor 202 is narrower than the external ground conductor 201 in a direction perpendicular to the direction of elongation of the signal conductor 203.

The miniature slow-wave transmission line 200 further comprises an array of floating auxiliary conductors 205 having a length crossing a direction of elongation of the signal conductor 203. For example, in the illustrated embodiment, the auxiliary conductors 205 have a length elongated perpendicular to the direction of elongation of the signal conductor 203, with the array disposed along the direction of elongation. The auxiliary conductors 205 may be disposed on a layer of the substrate 208 below the signal conductor 203 and the pair of ground conductors 201 and 202. The auxiliary conductors 205 may be capacitively coupled to the signal conductor 203, and may be conductively coupled to the ground conductors 201 and 202. The auxiliary conductors 205 being capacitively coupled to the signal conductor 203 may decrease a propagation velocity of the miniature slow-wave transmission line 200.

The signal conductor 203, the ground conductors 201 and 202, and the auxiliary conductors 205 may be formed of copper. The layer having the signal conductor 203 and the ground conductors 201 and 202 may be a thicker copper layer than the layer having the auxiliary conductors 205. Although the auxiliary conductors 205 are disposed below the signal conductor 203 and ground conductors 201 and 202 in the illustrated embodiment, it should be appreciated that in some embodiments the auxiliary conductors 205 are alternatively or additionally disposed on a layer above the signal conductor 203 and ground conductors 201 and 202.

A size of the miniature slow-wave transmission line 200 may be reduced through an asymmetrical configuration of the ground conductors 201 and 202. For example, the ground conductors 201 and 202 are asymmetrical if the internal ground conductor is narrower than the external ground conductor. In some embodiments, the external ground conductor 201 is significantly larger than the internal ground conductor 202. For example, the external ground conductor 201 may be a portion of a large sheet used in many or all miniature slow-wave transmission lines of a given phase shifter. The internal ground conductor 202 may only be used in one or two miniature slow-wave transmission lines of the phase shifter. In some embodiments, the external ground conductor 201 may be designed at a minimum allowable width. In some embodiments, the internal ground conductor 202 may be 10% narrower than the external ground conductor 201. In some embodiments, the internal ground conductor 202 may be at least 20% narrower than the external ground conductor 201. In some embodiments, the internal ground conductor 202 may be at least 50% narrower than the external ground conductor 201. In some embodiments, the internal ground conductor 202 may be at least 75% narrower than the external ground conductor 201. In a non-limiting example, the ground conductor 201 may be 100 microns in width, and the ground conductor 202 may be less than 15 microns, less than 10 microns, less than 5 microns, or less than 2.5 microns in width. In some embodiments, the internal ground conductor 202 is narrower than the signal conductor 203. Thus, the size of the miniature slow-wave transmission line 200 may be reduced.

The inventors have recognized and appreciated that an inductance of the miniature slow-wave transmission line 200 may be increased in an asymmetrical ground configuration.

When the internal ground conductor 202 is narrower than the external ground conductor 201, the increase in inductance may increase an impedance of the miniature slow-wave transmission line 200, creating an impedance discontinuity. However, if the internal ground conductor 202 and the external ground conductor 201 are conductively coupled, the inductance may be reduced. In the illustrated embodiment, the ground conductors 201 and 202 may each be conductively coupled to the auxiliary conductors 205 through vias 204, and thus may be coupled to one another through the auxiliary conductors 205. The auxiliary conductors 205 may behave as parallel inductors, which may cumulatively decrease the overall inductance of the structure and improve grounding of the internal ground conductor 202. Simultaneously, the auxiliary conductors 205 may capacitively couple to the signal conductor 203, thereby increasing the overall capacitance of the structure. In some embodiments, the ground conductors 201 and 202 are coupled through only some of the auxiliary conductors 205, and in alternative embodiments, the ground conductors 201 and 202 are coupled through all of the auxiliary conductors 205. Thus, the internal ground conductor 202 may be narrower than the external ground conductor 201 and the inductance of the miniature slow-wave transmission line 200 may be reduced resulting in improved grounding of the CPW structure with a reduced size.

Figure 3:
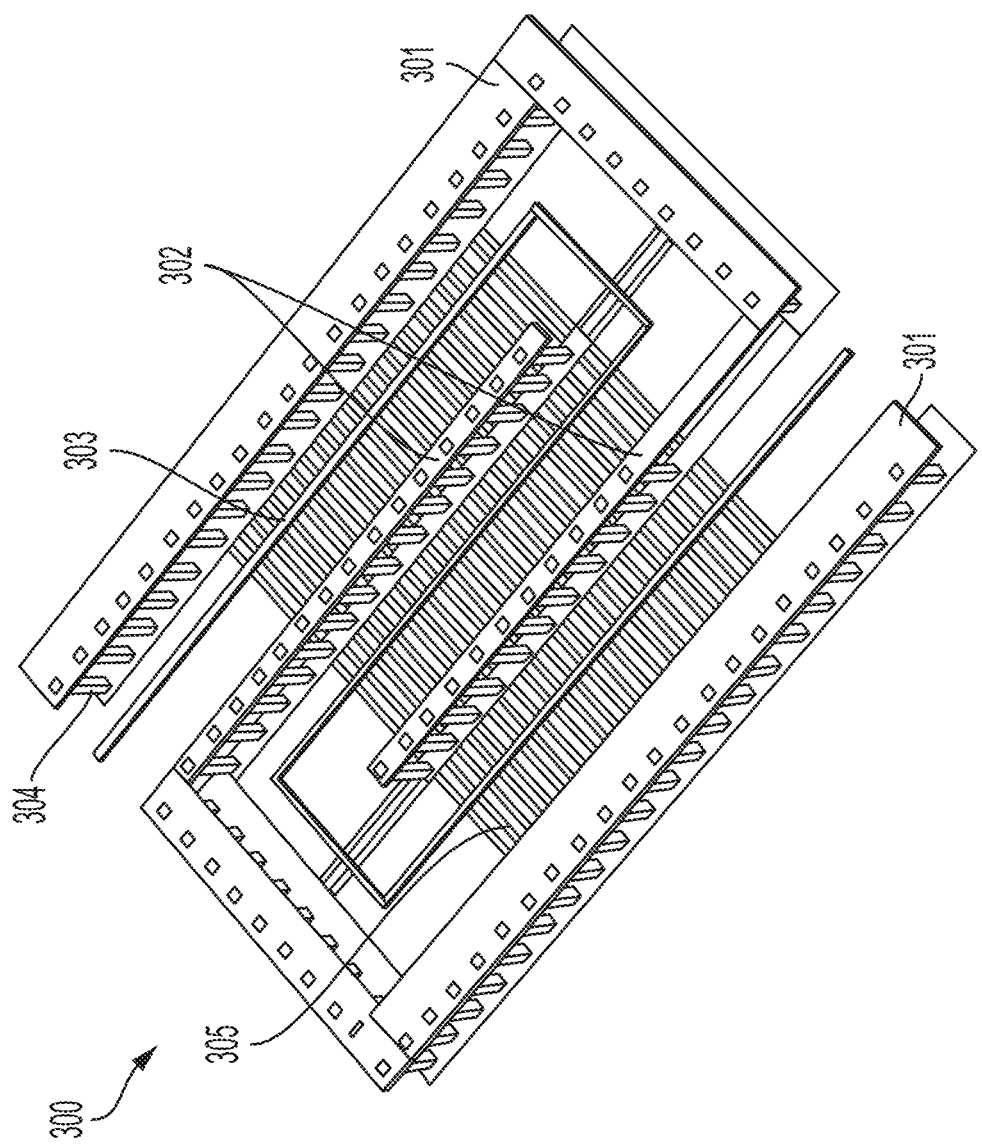
FIG. 3 is a perspective view of an implementation of a miniature slow-wave transmission line according to a non-limiting embodiment of the present application.

FIG. 3 illustrates an implementation of a miniature slow-wave transmission line 300 according to a non-limiting embodiment of the present application. In the illustrated embodiment, the miniature slow-wave transmission line 300 comprises a CPW in a meandering shape. A first section of the miniature slow-wave transmission line 300 is elongated in a first direction. A second section of the miniature slow-wave transmission line 300 is connected to and disposed alongside the first section, and elongated in a second direction opposite the first direction. A third section of the miniature slow-wave transmission line 300 is connected to and disposed alongside the second section, and elongated in the first direction. Thus, the miniature slow-wave transmission line 300 forms an "S" shape. It should be appreciated that the miniature slow-wave transmission line 300 may comprise fewer sections or more sections than as illustrated in FIG. 3. Each section of the miniature slow-wave transmission line 300 illustrated in FIG. 3 may be disposed in and may operate in the manner described in connection with the miniature slow-wave transmission line 200 of FIGS. 2A-2D.

Figure 4:
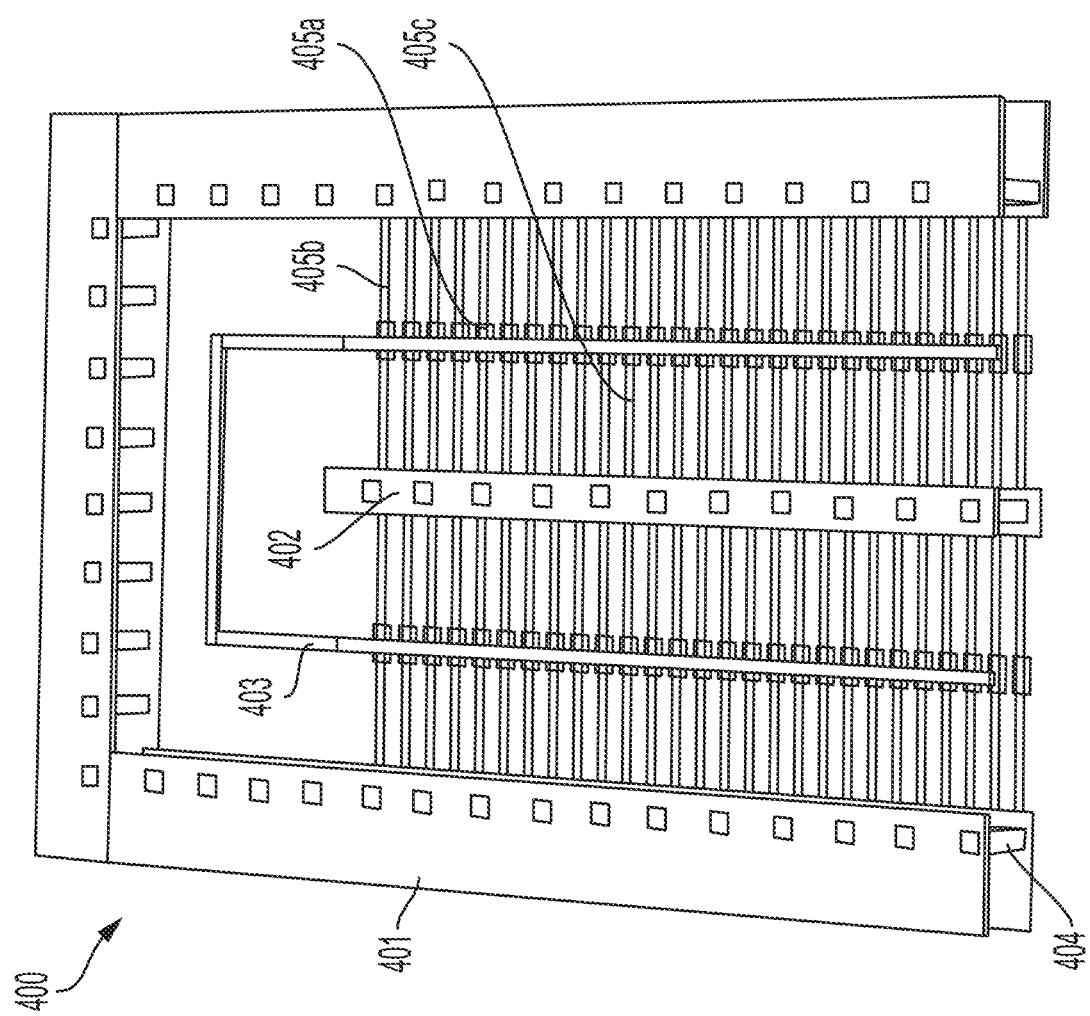
FIG. 4 is a perspective view of an implementation of a miniature slow-wave transmission line according to a non-limiting embodiment of the present application.

FIG. 4 illustrates an implementation of a miniature slow-wave transmission line 400 according to a non-limiting embodiment of the present application. In the illustrated embodiment, the transmission line comprises a CPW configured to operate in the manner described in connection with FIGS. 2A-2D. However, in this embodiment, a width of the array of auxiliary conductors may vary in the direction of elongation of the signal conductor 403. In the illustrative embodiment, the array of auxiliary conductors comprise first sections 405a underlying the signal conductor 403, and second and third sections 405b and 405c disposed on either side of the first section 405a. The first section 405a is wider than the second and third sections 405b and 405c in the direction of elongation of the signal conductor 403. In a non-limiting example, the first section 405a may be at least 20% wider than the second and third sections 405b and 405c, between 20% and 200% wider, or any value or range of values within that range, as non-limiting examples. Although the array of auxiliary conductors are disposed below the signal conductor 403 and ground conductors 401 and 402 in the illustrated embodiment, it should be appreciated that in some embodiments the array of auxiliary conductors are alternatively or additionally disposed on a layer above the signal conductor 403 and ground conductors 401 and 402.

By implementing non-uniform auxiliary conductors, the delay in a given length of the miniature slow-wave transmission line 400 may be increased, even when conductor density limitations (e.g. during manufacturing) only allow for a limited number of auxiliary conductors disposed along the miniature slow-wave transmission line 400. For example, a manufacturer may specify that the auxiliary conductors are to be spaced at least some distance from one another. A limited number of auxiliary conductors may limit an amount of capacitance and a corresponding amount of delay of the miniature slow-wave transmission line 400. However, if the auxiliary conductors are non-uniform, a wider section of the auxiliary conductors may be disposed below the signal conductor 403 for increased parasitic capacitance between the signal conductor 403 and the auxiliary conductors and a corresponding increased delay of the miniature slow-wave transmission line 400. Thus, delay may be maintained in the miniature slow-wave transmission line 400, even when conductor density limitations only allow for a limited number of auxiliary conductors, by implementing non-uniform auxiliary conductors. As a result, the miniature slow-wave transmission line 400 may be implemented having a reduced-length and increased delay.

Figure 5:
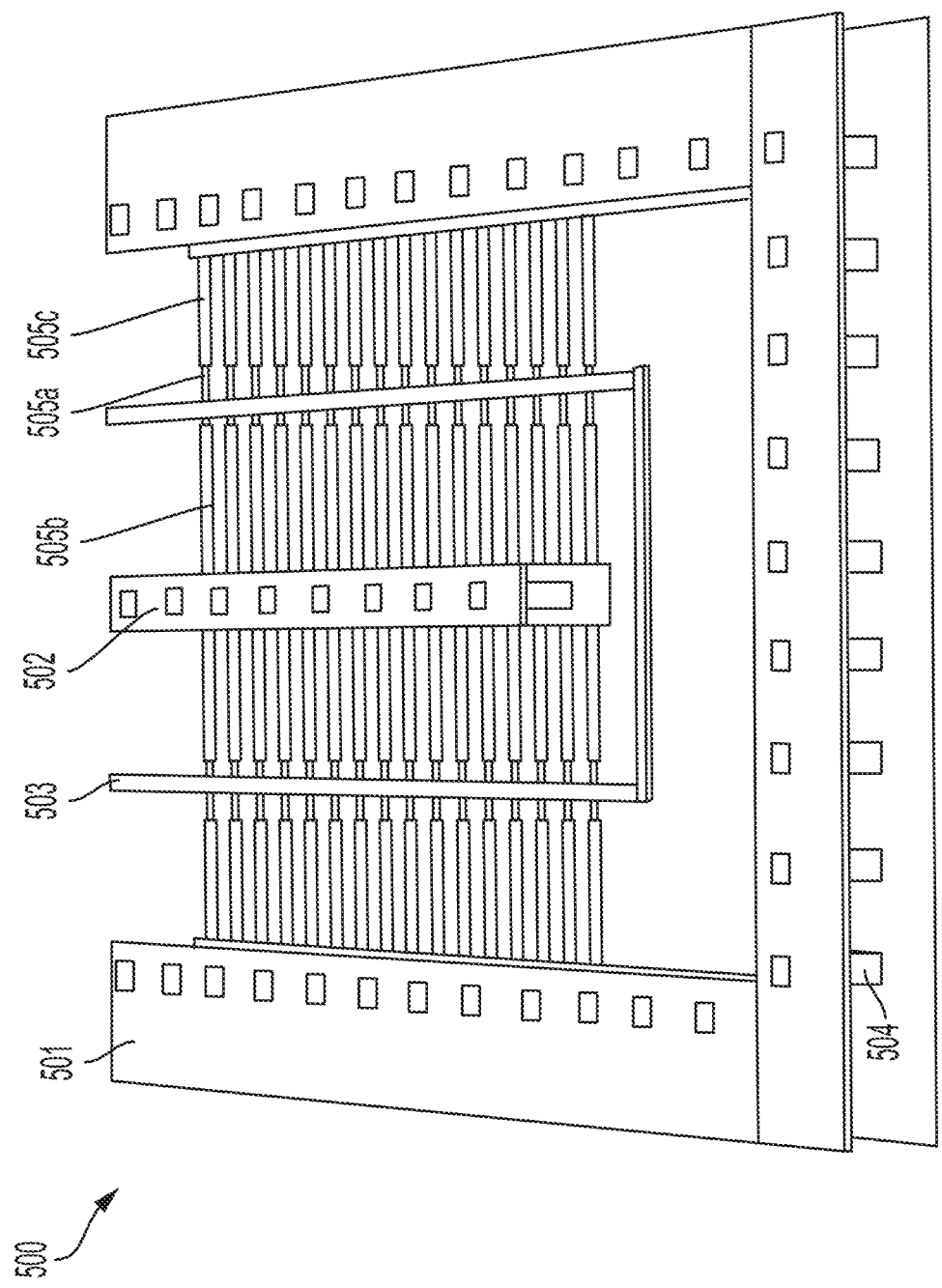
FIG. 5 is a perspective view of an implementation of a miniature slow-wave transmission line according to a non-limiting embodiment of the present application.

FIG. 5 illustrates an implementation of a miniature slow-wave transmission line 500 according to a non-limiting embodiment of the present application. In the illustrated embodiment, the miniature slow-wave transmission line 500 comprises a CPW similar to that which was described in connection with FIG. 4. However, in this embodiment, first sections 505a of the auxiliary conductors underlying the signal conductor 503 may be narrower than the second and third sections 505b and 505c in the direction of elongation of the signal conductor 503. In a non-limiting example, the first section 505a may be at least 20% narrower than the second and third sections 505b and 505c. Although the array of auxiliary conductors are disposed below the signal conductor 503 and ground conductors 501 and 502 in the illustrated embodiment, it should be appreciated that in some embodiments the array of auxiliary conductors are alternatively or additionally disposed on a layer above the signal conductor 503 and ground conductors 501 and 502. For example, the first sections 505a of the auxiliary conductors may be overlying the signal conductor 503.

By implementing non-uniform auxiliary conductors, the delay in a given length of the miniature slow-wave transmission line 500 may be reduced while maintaining an impedance match, even when conductor density limitations (e.g. during manufacturing) only allow for a limited number of auxiliary conductors disposed along the miniature slow-wave transmission line 500. For example, a manufacturer may specify that the auxiliary conductors are to be spaced at least some distance from one another. A limited number of auxiliary conductors may limit an amount of capacitance and a corresponding amount of delay of the miniature slow-wave transmission line 500. While this is may be acceptable when reduced delay is desired, the limited amount of capacitance may not be reduced enough, and also may cause an impedance of the miniature slow-wave transmission line 500 to increase. However, if the auxiliary conductors are non-uniform, a narrower section of the auxiliary conductors may be disposed below the signal conductor 503 for decreased parasitic capacitance between the signal conductor 503 and the auxiliary conductors and a corresponding reduced delay of the miniature slow-wave transmission line 500. Additionally, if the auxiliary conductors are wider outside of the narrower section, an inductance of the miniature slow-wave transmission line 500 may decrease along with the decreased overall capacitance. As a result, the impedance of the miniature slow-wave transmission line 500 may remain substantially constant. Thus, delay may be reduced while maintaining impedance match in a given length of the miniature slow-wave transmission line 500, even when conductor density limitations only allow for a limited number of auxiliary conductors, by implementing non-uniform auxiliary conductors. As a result, the miniature slow-wave transmission line 500 may be implemented having a reduced length and a more desirable impedance.

Figure 6:
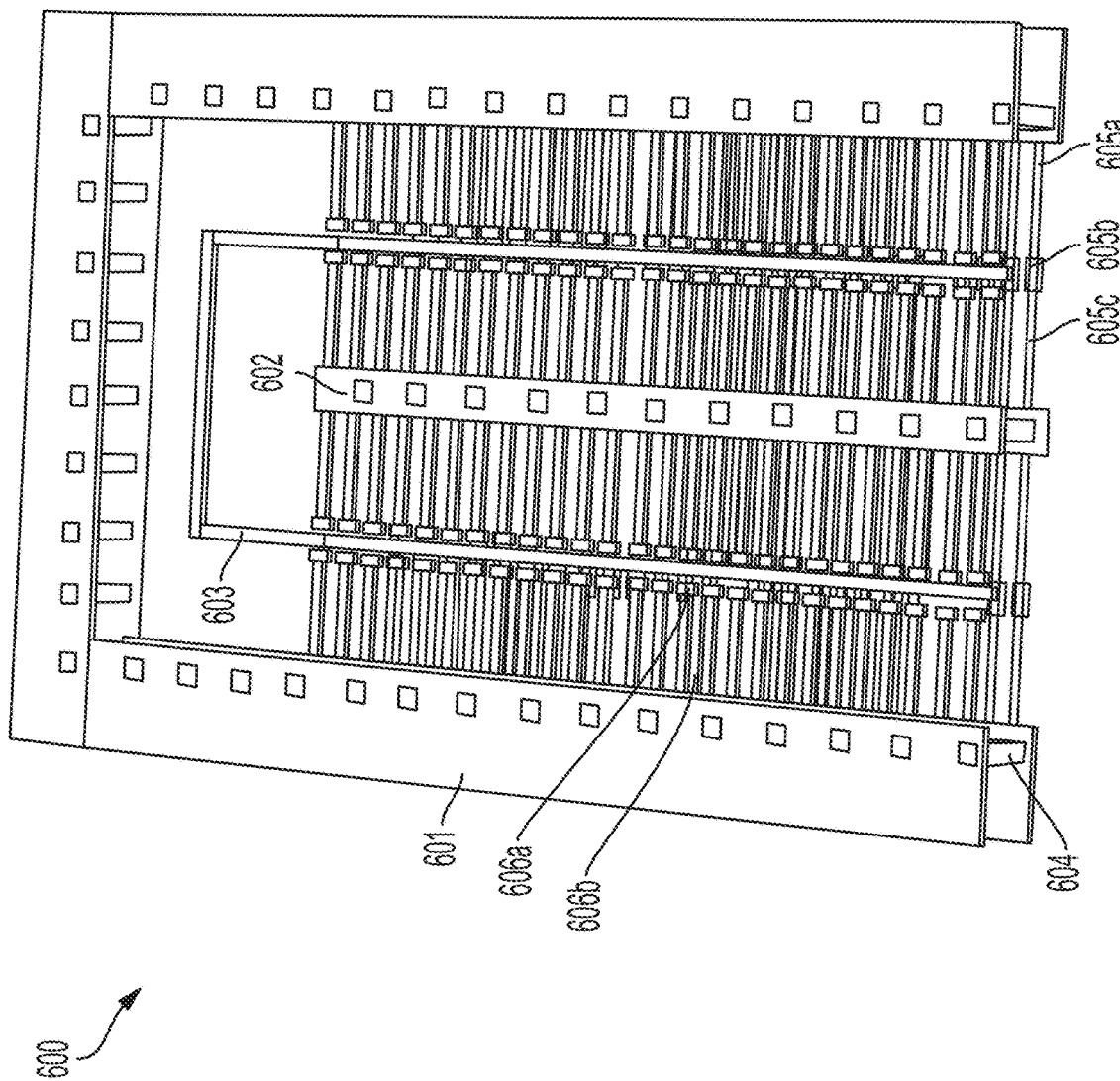
FIG. 6 is a perspective view of an implementation of a miniature slow-wave transmission line according to a non-limiting embodiment of the present application.

FIG. 6 illustrates an implementation of a miniature slow-wave transmission line 600 according to a non-limiting embodiment of the present application. In the illustrated embodiment, the miniature slow-wave transmission line 600 comprises a CPW similar to that which was described in connection with FIG. 4. However, in this embodiment, the external ground conductor 601 and the internal ground conductor 602 each comprise conductive strips extending towards the signal conductor 603. The conductive strips are disposed in a same layer as the signal conductor 603 and the external and internal ground conductors 601 and 602. Each of the conductive strips comprises a first section 606a proximate the signal conductor 603, and a second section 606b distal the signal conductor 603. The second section 606b may be coupled to a respective ground conductor, and the first section 606b may extend from the second section 606b towards the signal conductor 603. In some embodiments, the first section 606a is wider than the second section 606b in the direction of elongation of the signal conductor 603. In some embodiments, the first and second sections 606a and 606b of the conductive strips are of uniform width. Although the array of auxiliary conductors are disposed below the signal conductor 603 and ground conductors 601 and 602 in the illustrated embodiment, it should be appreciated that in some embodiments the array of auxiliary conductors are alternatively or additionally disposed on a layer above the signal conductor 603 and ground conductors 601 and 602.

The delay of the miniature slow-wave transmission line 600 may be further increased by having conductive strips disposed in the same layer as the signal conductor 603 and the ground conductors 601 and 602, and extending from one or both of the ground conductors towards the signal conductor 603. The widened second section 606b of the conductive strips may be disposed adjacent the signal conductor 603, configured for capacitively coupling to the signal conductor 603. Thus, an overall capacitance of the miniature slow-wave transmission line 600 may be increased, resulting in an increased delay of the structure. As a result, the miniature slow-wave transmission line 600 may be implemented having a reduced length and increased delay.

Figure 7:
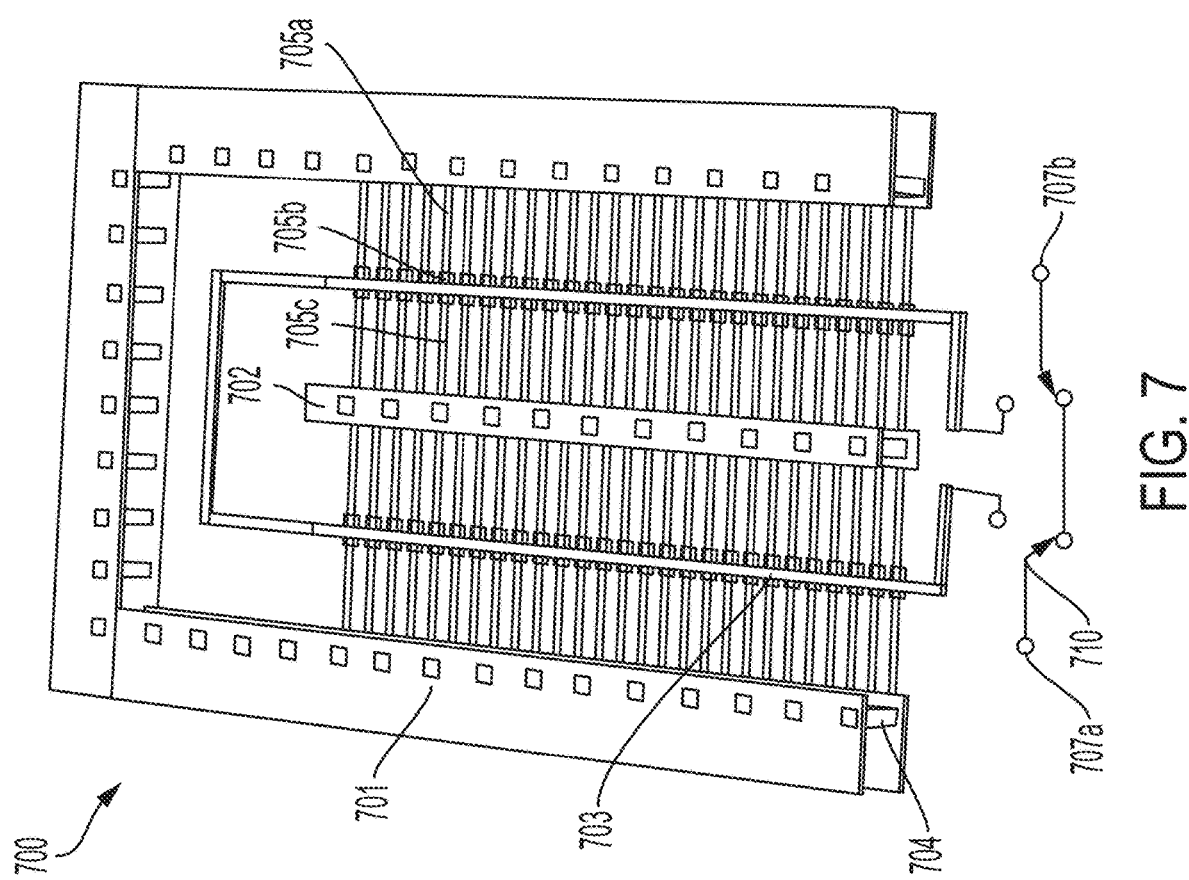
FIG. 7 is a perspective view of an implementation of a phase shifter comprising a slow-wave structure according to a non-limiting embodiment of the present application.

FIG. 7 illustrates an implementation of a phase shifter 700 comprising a slow-wave structure according to a non-limiting embodiment of the present application. In the illustrated embodiment, the phase shifter 700 comprises an input 707a, an output 707b, a switch 710 configured to control a variable delay signal path from the input 707a to the output 707b, and a miniature slow-wave transmission line switchable into and out of the variable delay signal path between the input 707a and the output 707b. The miniature slow-wave transmission line may be configured to operate in the manner described in connection with FIG. 4. The phase shifter 700 is configured to introduce a variable phase shift to the signal received at the input 707a. For example, when the miniature slow-wave transmission line is switched into the variable delay signal path, the phase shifter 700 may introduce a delay to a signal received at the input 707a and produce a phase shifted version of the signal at the output 707b. When the miniature slow-wave transmission line is switched out of the variable delay signal path, the input 707a and output 707b are connected together, bypassing the miniature slow-wave transmission line and providing little or no phase shift at the output 707b. Accordingly, the signal provided at the output 707b will be substantially equal to the signal received at the input 707a.

The switch 710 may be configured to switch the miniature slow-wave transmission line into and out of the variable delay signal path between the input 707a and the output 707b. The switch 710 may comprise one or more transistors such as MOSFETs configured to switch the miniature slow-wave transmission line into or out of the variable delay signal path connecting the input 707a and the output 707b of the phase shifter 700. For example, a channel of one transistor may comprise a bypass path in parallel with the miniature slow-wave transmission line, with a drain of the transistor coupled to the input 707a and a source coupled to the output 707b of the phase shifter 700, and a gate of the transistor may be configured to receive a control signal, for example from the controller 180. Alternatively, the drain may be connected to the output 707b and the source may be connected to the input 707a. In some embodiments, the control signal may comprise a single bit. Alternatively, the control signal may comprise multiple bits, or an analog or mixed A/D signal. In a first configuration, the transistor may be switched on at the gate, and configured to switch the miniature slow-wave transmission line out of the variable delay signal path by connecting the input 707a to the output 707b, thus bypassing the miniature slow-wave transmission line. In a second configuration, the transistor may be switched off at the gate, thereby comprising an open circuit, such that the miniature slow-wave transmission line is switched into the variable delay signal path. The miniature slow-wave transmission line may comprise a least resistance route for signals received at the input 707a to reach the output 707b. Alternatively, when the miniature slow-wave transmission line is switched out of the variable delay signal path, signals received at the input 707a may be routed through a conductor in parallel with the miniature slow-wave transmission line. In some embodiments, the transistors may be configured to receive multiple control signals. In some embodiments, the transistors may be configured to receive a single control signal, with some of the transistors configured to receive a modified (e.g. inverted) version of the single control signal.

It should be appreciated that, in some embodiments, the phase shifter 700 may include features of any or all embodiments of the miniature slow-wave transmission lines described in connection with FIGS. 2A-2D and 3-6. For example, the phase shifter 700 may include conductive strips extending from the ground conductors 701 and 702 towards the signal conductor 703, as described herein including with reference to FIG. 6. Additionally, different embodiments of miniature slow-wave transmission lines may be implemented together in the phase shifter 700. For example, a first miniature slow-wave transmission line of the phase shifter 700 may include conductive strips, and a second miniature slow-wave transmission line of the phase shifter 700 may not include the conductive strips.

Figure 8:
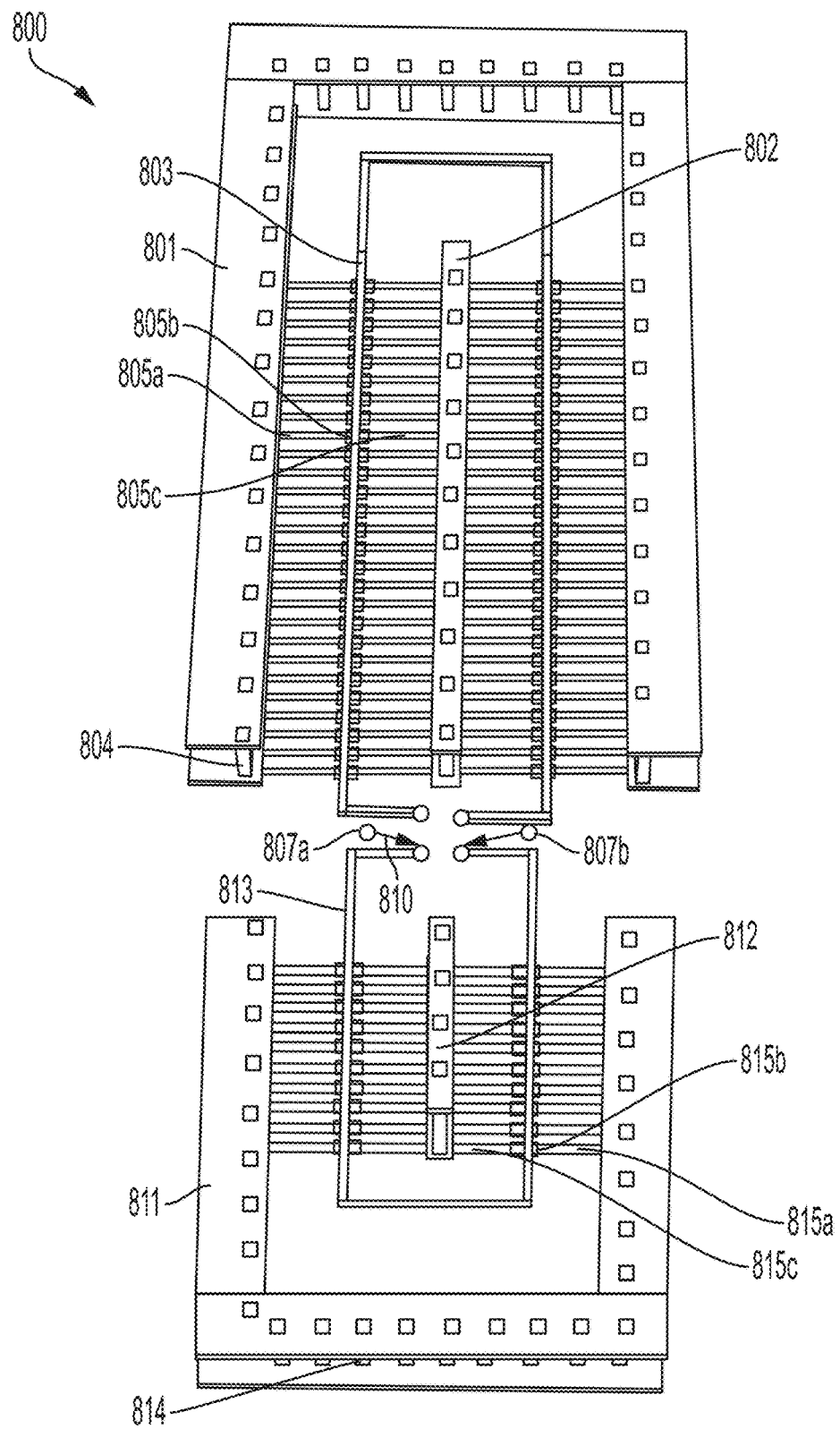
FIG. 8 is a perspective view of an implementation of a slow-wave phase shifter according to a non-limiting embodiment of the present application.

FIG. 8 illustrates an implementation of a slow-wave phase shifter 800 according to a non-limiting embodiment of the present application. In the illustrated embodiment, the phase shifter 800 comprises an input 807a, an output 807b, one or more switches 810 configured to control a variable delay signal path from the input 807a to the output 807b, and multiple miniature slow-wave transmission lines switchable into or out of the variable delay signal path. The miniature slow-wave transmission lines may be configured to operate in the manner described in connection with FIG. 4. The phase shifter 800 is configured to introduce a variable phase shift to the signal received at the input 807a. For example, when a first of the miniature slow-wave transmission lines (e.g., having signal conductor 803) is switched into the variable delay signal path and a second of the miniature slow-wave transmission lines (e.g., having signal conductor 813) is switched out of the variable delay signal path, the phase shifter 800 may introduce a first delay to a signal received at the input 807a, resulting in a first phase shifted version of the signal at the output 807b. When the second of the miniature slow-wave transmission lines is switched into the variable delay signal path and the first of the miniature slow-wave transmission lines is switched out of the variable delay signal path, the phase shifter 800 may introduce a second delay to a signal received at the input 807a, resulting in a second phase shifted version of the signal at the output 807b. The switch(es) 810 may be configured to switch the miniature slow-wave transmission lines into or out of the variable delay signal path between the input 807a and the output 807b.

The delay of the first and second miniature slow-wave transmission lines may be different, resulting in different phase shifted versions of the signals depending on a delay of the variable delay signal path. In the illustrated embodiment, the first miniature slow-wave transmission line is longer in signal conductor length than the second miniature slow-wave transmission line. Accordingly, the first miniature slow-wave transmission line provides an increased delay compared to the second miniature slow-wave transmission line. In some embodiments, the first miniature slow-wave transmission line exhibits a slower wave speed than the second miniature slow-wave transmission line.

The switch(es) 810 may comprise one or more transistors such as MOSFETs configured to switch the first and second transmission lines into or out of the variable delay signal path between the input 807a and the output 807b of the phase shifter 800 depending on a state of the transistors. For example, a channel of a first transistor may be coupled between the input 807a and the first miniature slow-wave transmission line, and a second transistor may be coupled between the first miniature slow-wave transmission line and the output 807b of the phase shifter. A channel of a third transistor may be coupled between the input 807a and the second miniature slow-wave transmission line, and a fourth transistor may be coupled between the second miniature slow-wave transmission line and the output 807b of the phase shifter. The gates of the first and second transistors may be configured to receive a control signal. The gates of the third and fourth transistors may be configured to receive a modified (e.g., inverted) version of the control signal. In some embodiments, the control signal may comprise a single bit. Alternatively, the control signal may comprise multiple bits, or an analog or mixed A/D signal. In the first configuration, the first and second transistors may be switched on and the third and fourth transistors may be switched off. The first and second transistors may be configured to switch the first miniature slow-wave transmission line into the variable delay signal path between the input 807a to the output 807b, and the third and fourth transistors may comprise open circuits to switch the second miniature slow-wave transmission line out of the variable delay signal path. In the second configuration, the third and fourth transistors are switched on and the first and second transistors are switched off. The third and fourth transistors may be configured to switch the second miniature slow-wave transmission line into the variable delay signal path between the input 807a to the output, and the first and second transistors may comprise open circuits to switch the first miniature slow-wave transmission line out of the variable delay signal path. In some embodiments, the first, second, third and fourth transistors are configured to receive multiple control signals. In some embodiments, multiple pairs of miniature slow-wave transmission lines are coupled between the input 807a and the output 807b, and multiple switches or sets of switches corresponding to each pair may receive a different control signal. For example, a 6 bit phase shifter may comprise 6 pairs of miniature slow-wave transmission lines with one bit controlling each pair. Thus, the switch(es) 810 may be configured to switch the first and second miniature slow-wave transmission lines into and out of the variable delay signal path between the input 807a and output 807b of the phase shifter 800.

It should be appreciated that any or all embodiments of the miniature slow-wave transmission line described in connection with FIGS. 2A-2D and 3-6 may be implemented as some or all of the miniature slow-wave transmission lines in the phase shifter 800. Additionally, multiple different embodiments of miniature slow-wave transmission lines may be implemented together in the phase shifter 800.

Figure 9:
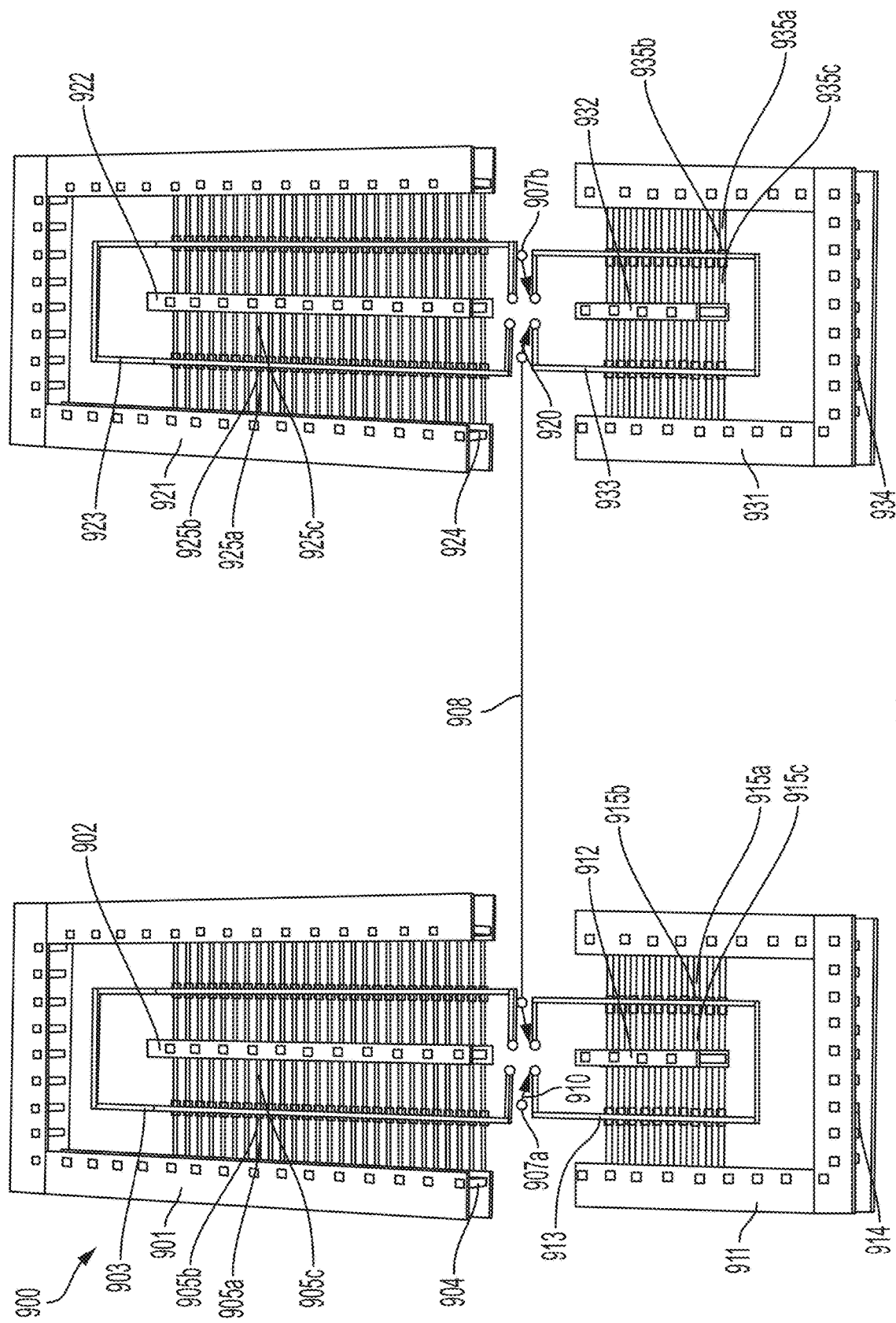
FIG. 9 is a perspective view of an implementation of a slow-wave phase shifter according to a non-limiting embodiment of the present application.

FIG. 9 illustrates an implementation of a slow-wave phase shifter 900 according to a non-limiting embodiment of the present application. In the illustrative embodiment, phase shifter 900 comprises an input 907a, an output 907b, switches 910 and 920 configured to control a variable delay signal path from the input 907a to the output 907b, and miniature slow-wave transmission lines switchable into and out of the variable delay signal path. The miniature slow-wave transmission lines are coupled together by a connecting trace 908, and each may be configured to operate in the manner described in connection with FIG. 4. The phase shifter 900 is configured to introduce a variable phase shift to the signal received at the input 907a. For example, the miniature slow-wave transmission lines may be switchable into and out of being cascaded in series through the connecting trace 908. The switch(es) 910 may be configured to switch first and second miniature slow-wave transmission lines into or out of the variable delay signal path from the input 907a to the output 907b, and the switch(es) 920 may be configured to switch third and fourth miniature slow-wave transmission lines into or out of the variable delay signal path in series with one of the first and second miniature slow-wave transmission lines via the connecting trace 908. The first, second, third, and fourth miniature slow-wave transmission lines may be configured to provide delay different from one another, resulting in a variable delay of the miniature slow-wave transmission lines switched into and out of the variable delay signal path.

The phase shifter 900 may be configured to provide a variable delay between the inputs 907a and the output 907b depending on which of four illustrated miniature slow-wave transmission lines are switched into or out of the variable delay signal path. For example, when the first and third miniature slow-wave transmission lines (e.g., having signal conductors 903 and 923 respectively) are switched into the variable delay signal path and the second and fourth miniature slow-wave transmission lines (e.g., having signal conductors 913 and 933 respectively) are switched out of the variable delay signal path, the phase shifter 900 may introduce a first delay to a signal received at the input 907a, resulting in a first phase shifted version of the signal at the output 907b. When the first and fourth miniature slow-wave transmission lines are switched into the variable delay signal path and the second and third miniature slow-wave transmission lines are switched out of the variable delay signal path, the phase shifter 900 may introduce a second delay to a signal received at the input 907a, resulting in a second phase shifted version of the signal at the output 907b. When the second and third miniature slow-wave transmission lines are switched into the variable delay signal path, the phase shifter 900 may introduce a third delay, resulting in a third phase shifted version of the signal at the output 907b. When the second and fourth miniature slow-wave transmission lines are switched into the variable delay signal path, the phase shifter 900 may introduce a fourth delay, resulting in a fourth phase shifted version of the signal at the output 907b. The delay of the first, second, third, and fourth miniature slow-wave transmission lines may be different, resulting in different first, second, third, and fourth phase shifted versions of the signal. It should be appreciated that the phase shifter 900 may comprise greater than or fewer than four miniature slow-wave transmission lines. For example, a second connecting trace may couple the output 907b to a fifth miniature slow-wave transmission line.

In some embodiments, the miniature slow-wave transmission lines may be configured to provide different delay due to differences in physical length and/or wave speed. Alternatively or additionally, in some embodiments, the delay of some of the first, second, third, and fourth miniature slow-wave transmission lines may be equal. For example, the first and third miniature slow-wave transmission lines may be configured to provide an equal delay, and the second and fourth miniature slow-wave transmission lines may be configured to provide an equal delay. It should be appreciated that the miniature slow-wave transmission lines may be configured in any order regardless of delay.

The phase shifter 900 further comprises multiple sets of switches 910 and 920 configured to switch the miniature slow-wave transmission lines into or out of the variable delay signal path between the inputs 907a and the outputs 907b in response to control signals received from a controller such as controller 180 described in connection with FIG. 1. In some embodiments, a set of switches such as 910 or 920 may be configured to control a pair of miniature slow-wave transmission lines, such that a first of the pair is switched into the variable delay signal path, and a second of the pair is switched out of the variable delay signal path, depending on a bit received from the controller. For example, a 6 bit phase shifter may comprise 6 pairs of miniature slow-wave transmission lines coupled in series with one bit controlling each pair of miniature slow-wave transmission lines. Alternatively, one or more of the pairs may comprise a single miniature slow-wave transmission line switchable into or out of the variable delay signal path such that when switched out, no miniature slow-wave transmission line is switched into the variable delay signal path. For example, the miniature slow-wave transmission line may be bypassed by a short circuit as described herein in connection with FIG. 7. Thus, the switches may be configured to switch the miniature slow-wave transmission lines into or out of the variable delay signal path from the input 907a to the output 907b of the phase shifter 900.

It should be appreciated that any or all embodiments of the miniature slow-wave transmission line described in connection with FIGS. 2A-2D and 3-6 may be implemented as some or all of the miniature slow-wave transmission lines in the phase shifter 900. Additionally, multiple different embodiments of miniature slow-wave transmission lines may be implemented together in the phase shifter 900.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A miniature slow-wave transmission line, comprising:
   a substrate;
   a signal conductor fabricated on a first layer of the substrate;
   first and second ground conductors fabricated on the first layer, disposed on opposite sides of the signal conductor and being asymmetrical about the signal conductor, wherein the first ground conductor is narrower than the second ground conductor in a first direction substantially perpendicular to a direction of elongation of the signal conductor, and wherein, at a first point along the direction of elongation of the signal conductor, the signal conductor is the only signal conductor disposed between the first and second ground conductors in the first direction; and
   a plurality of auxiliary conductors fabricated on a second layer of the substrate, capacitively coupled to the signal conductor and conductively coupled to the first and second ground conductors.

2. The miniature slow-wave transmission line of claim 1, wherein a first auxiliary conductor of the plurality of auxiliary conductors comprises a first section underlying or overlying the signal conductor and second and third sections on corresponding sides of the first section, the first section having a width at least 20% greater than widths of the second and third sections.

3. The miniature slow-wave transmission line of claim 1, wherein a first auxiliary conductor of the plurality of auxiliary conductors has a length crossing the direction of elongation of the signal conductor, and further has a width varying by at least 20% at different points along the length.

4. The miniature slow-wave transmission line of claim 3, wherein the first auxiliary conductor of the plurality of auxiliary conductors comprises a first section underlying or overlying the signal conductor and second and third sections on corresponding sides of the first section, the first section having a width at least 20% less than widths of the second and third sections.

5. The miniature slow-wave transmission line of claim 3, wherein the first ground conductor is at least 50% narrower than the second ground conductor in the first direction.

6. The miniature slow-wave transmission line of claim 5, wherein the first ground conductor is at least 75% narrower than the second ground conductor in the first direction.

7. The miniature slow-wave transmission line of claim 3, wherein the first ground conductor comprises a plurality of conductive strips extending towards the signal conductor, a first conductive strip of the plurality of conductive strips having a first section proximate the signal conductor and a second section distal the signal conductor, the first section being wider than the second section in the direction of elongation of the signal conductor.

8. The miniature slow-wave transmission line of claim 3, further comprising a second plurality of auxiliary conductors fabricated on a third layer of the substrate, capacitively coupled to the signal conductor and conductively coupled to the first and second ground conductors, the second plurality of auxiliary conductors comprising:
- a first auxiliary conductor having a length crossing the direction of elongation of the signal conductor, and comprising a first section underlying or overlying the signal conductor and second and third sections on corresponding sides of the first section, the first section having a width either less than or greater than widths of the second and third sections by at least 20%.

9. A phase shifter, comprising:
- a substrate;
- a variable delay signal path between an input and an output of the phase shifter comprising a plurality of slow-wave transmission lines switchable into and out of the variable delay signal path, a first slow-wave transmission line of the plurality of slow-wave transmission lines comprising:
  - a signal conductor on a first layer of the substrate;
  - first and second ground conductors on the first layer, disposed on opposite sides of the signal conductor and being asymmetrical about the signal conductor, wherein the first ground conductor is narrower than the second ground conductor in a first direction substantially perpendicular to a direction of elongation of the signal conductor, and wherein, at a first point along the direction of elongation of the signal conductor, the signal conductor is the only signal conductor disposed between the first and second ground conductors in the first direction; and
  - a plurality of auxiliary conductors on a second layer of the substrate, capacitively coupled to the signal conductor and conductively coupled to the first and second ground conductors.

10. The phase shifter of claim 9, wherein a first auxiliary conductor of the plurality of auxiliary conductors has a length crossing the direction of elongation of the signal conductor, and comprises a first section underlying or overlying the signal conductor, and second and third sections on corresponding sides of the first section, the first section having a width either less than or greater than widths of the second and third sections by at least 20%.

11. The phase shifter of claim 10, wherein the plurality of slow-wave transmission lines switching into and out of the variable delay signal path is controlled by a state of one or more metal oxide semiconductor field effect transistors (MOSFETs).

12. The phase shifter of claim 10, wherein the variable delay signal path is configured such that when the first slow-wave transmission line is switched into the variable delay signal path, a second slow-wave transmission line of the plurality of slow-wave transmission lines is switched out of the variable delay signal path.

13. The phase shifter of claim 12, wherein the first slow-wave transmission line is configured to provide a delay different from the second slow-wave transmission line.

14. The phase shifter of claim 9, wherein the first ground conductor is at least 50% narrower than the second ground conductor in the first direction.

15. The phase shifter of claim 9, wherein a second slow-wave transmission line of the plurality of slow-wave transmission lines is switchable into and out of being cascaded in series with the first slow-wave transmission line.

16. A system, comprising:
- a phase shifter, comprising:
  - a substrate;
  - a variable delay signal path between an input and an output of the phase shifter comprising a plurality of slow-wave transmission lines switchable into and out of the variable delay signal path, the plurality of slow-wave transmission lines including a first slow-wave transmission line and a second slow-wave transmission line, the first slow-wave transmission line comprising:
    - a signal conductor on a first layer of the substrate;
    - first and second ground conductors on the first layer, disposed on opposite sides of the signal conductor and being asymmetrical about the signal conductor;
    - a plurality of auxiliary conductors on a second layer of the substrate, capacitively coupled to the signal conductor and conductively coupled to the first and second ground conductors; and
  - a controller comprising one or more components configured to transmit logic signals to a plurality of switches to control the plurality of slow-wave transmission lines switching into and out of the variable delay signal path,
  wherein the second slow-wave transmission line is switchable into and out of being cascaded in series with the first slow-wave transmission line.

17. The system of claim 16, wherein the variable delay signal path is configured such that when the first slow-wave transmission line is switched into the variable delay signal path, a third slow-wave transmission line of the plurality of slow-wave transmission lines is switched out of the variable delay signal path.

18. The system of claim 17, wherein the first slow-wave transmission line is configured to provide a delay different from the third slow-wave transmission line.

19. The system of claim 16, wherein a first auxiliary conductor of the plurality of auxiliary conductors has a length crossing a direction of elongation of the signal conductor, and comprises a first section underlying or overlying the signal conductor, and second and third sections on corresponding sides of the first section, the first section having a width either greater than or less than widths of the second and third sections by at least 20% at different points along the length.

20. The system of claim 16, wherein the first ground conductor is at least 50% narrower than the second ground conductor in a direction substantially perpendicular to a direction of elongation of the signal conductor.

* * * * *